May 1, 1928.  1,668,330

F. L. MORSE

FLEXIBLE COUPLING

Filed Dec. 29, 1923

INVENTOR
Frank L. Morse
BY
Synnestvedt & Lechner
ATTORNEYS

Patented May 1, 1928.

1,668,330

UNITED STATES PATENT OFFICE.

FRANK L. MORSE, OF ITHACA, NEW YORK, ASSIGNOR TO MORSE CHAIN COMPANY, A CORPORATION OF NEW YORK.

FLEXIBLE COUPLING.

Application filed December 29, 1923. Serial No. 683,294.

This invention relates to flexible couplings for the purpose of connecting shafts arranged end to end and is particularly useful where the shafts may be slightly out of alignment. In this type some form of silent chain is often used as the flexible element.

These flexible couplings ordinarily consist of a pair of flat faced members, one of which is mounted on an end of each of the two shafts to be joined, the faced members being provided with teeth to receive a chain for coupling them together. One of the chief objections incident to this construction has been that the chain pins shear off causing interruption in operation of the device being driven with the possibility of serious damage. In such couplings the pins are subject to direct shear between the face of the flat faced coupling members, in fact the pins alone are subject to all of the shearing stresses.

One of the primary objects of my invention is to provide a coupling in which the foregoing objections are overcome and in which the driving stresses are distributed to certain of the links as well as to the pins, without increasing the size of the coupling or flexible member whereby the life of the coupling is materially increased.

Another object of my invention is the provision of an improved coupling which will drive its associated mechanism without interruption even should the pins shear or the chain stretch.

Still another object of my invention has to do with the provision of improved means whereby the driving connection is made not only by the chain pins but also by certain links of the chain in addition.

Still another object of my invention is the provision of an improved coupling which is simple to manufacture and which is far stronger than couplings ordinarily employed for the purposes to be hereinafter more fully set forth, but which is nevertheless, as flexible as required and of a size comparable to existing couplings.

I accomplish the foregoing, together with such other objects and advantages as may be incident to my invention by means of a construction which I have illustrated in preferred form in the accompanying drawings wherein.

Figure 2:
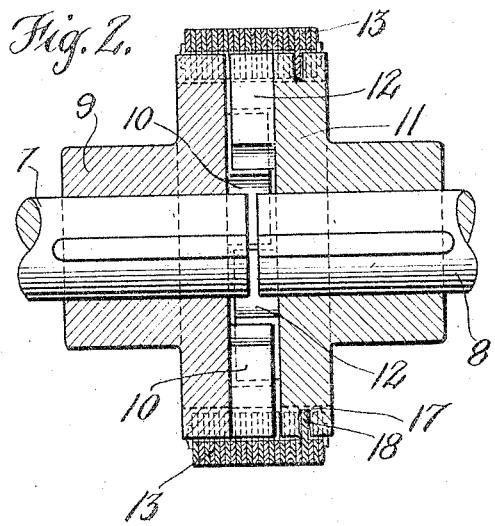
Fig. 2 is a section on line 2—2 of Fig. 1.

Referring now to the drawings, one of the shafts to be connected is indicated by the reference numeral 7, and the other shaft by the reference numeral 8. The shaft 7 has secured thereto, by means of a key or other securing means, a flanged coupling member 9, having a plurality of jaws or lugs 10 which are sector shaped as will be seen in Figs. 1 and 3 and extend to the periphery of the coupling member 9. The shaft 8 has a similar coupling member 11 having jaws 12. The jaws are made of a size so that the spaces between them are somewhat larger than the jaws, which permits a certain amount of movement of the members 9 and 11 before the jaws engage.

The flexible element in the embodiment shown consists of the chain 13 which is of a type commercially known as a "silent chain". The periphery of the flanges of the coupling members 9 and 11 are provided with gear teeth which extend across the peripheral surface of the sector like jaws 10 and 12 for receiving the chain 13.

Figure 1:
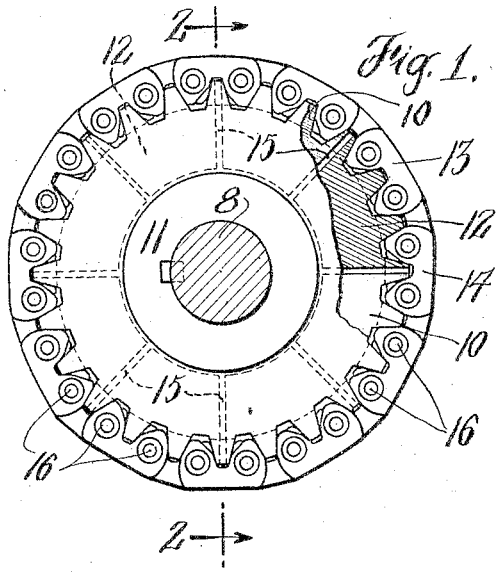
Fig. 1 is a face view of my improved coupling, with a portion broken away to show the construction of the jaws more clearly.
Figure 3:
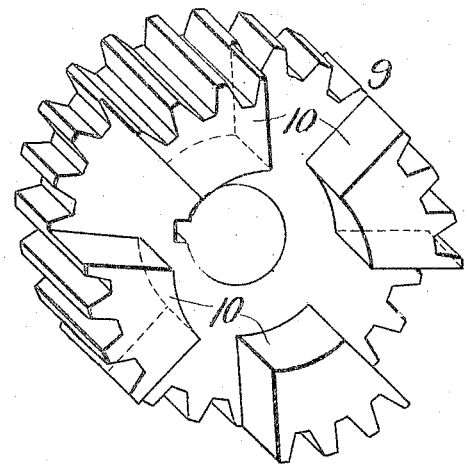
Fig. 3 is a perspective view of one of the coupling members.
Figure 4:
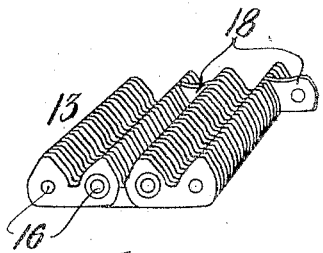
Fig. 4 is a fragment of the chain or flexible element.
Figure 5:
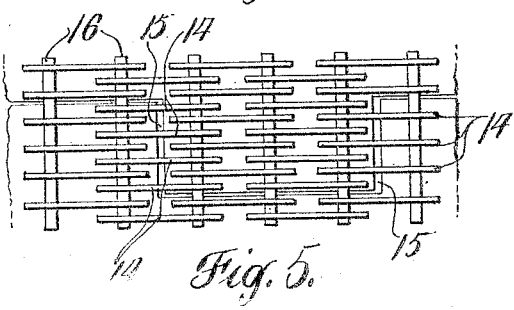
Fig. 5 is a development showing more clearly how the links straddle the spaces between the jaws on the coupling members.

It will be seen that by having these teeth extend across the jaws certain of the links, as at 14 see Figs. 1 and 5, straddle the spaces 15 between adjacent jaws of the opposite members 9 and 11 engaging the two half teeth of these jaws, so that the driving stresses are taken by these links as well as by the pins 16 of the chain. The half teeth are best seen in Figs. 1 and 3. It will be apparent that by this arrangement the chain pins are subjected to an appreciably less amount of strain, the stresses being taken for the most part by the straddling links 14.

To prevent the chain from being displaced, one of the coupling members, in this instance member 11, is provided with a groove 17 for receiving the web links 18 of the chain 13.

In normal operation the torque stresses are transmitted from the coupling member 9 through the flexible element 13 to the other coupling member 11. It has been found that when couplings of this general type are used with large powers either the pins shear or the chain stretches which causes a very objectionable interruption of service. To safeguard against such interruption I have provided the jaws 10 and 12 on the coupling members which are adapted to take hold should the chain break or stretch whereby a shut down may be postponed until some convenient time.

From the foregoing it will be seen that my improvements are advantageous in that the chain pins are relieved of many of the stresses which greatly increases the useful life of the coupling. Also with the safeguard against interruption such couplings are very well adapted for large power and high speed work. It will be seen, therefore, that I have provided a coupling of superior strength and longer life without increasing the size of the coupling over that of ordinary chain couplings now in use.

I claim:

1. A driving connection for two approximately aligned shafts, comprising in combination gear-like members secured at the ends of the shafts, peripherally toothed interlocking jaws on the gear-like members normally out of contact, and a flexible element connecting the gear members and engaging the teeth thereon, and also the teeth on the interlocking jaws.

2. A flexible coupling for power shafts comprising a coupling member secured to each of the shafts, spaced jaws on the adjacent faces of the coupling members extending to the circumference of said members, gear teeth on the cylindrical surface of the coupling members extending across the jaws, and a chain wrapped around the coupling members engaging the gear teeth, some of the links of the chain straddling teeth on adjacent jaws of opposite couplings.

In testimony whereof, I have hereunto signed my name.

FRANK L. MORSE.